United States Patent [19]

Voetter et al.

[11] Patent Number: 4,508,041
[45] Date of Patent: Apr. 2, 1985

[54] PROCESS FOR THE COMBUSTION OF COKE PRESENT ON SOLID PARTICLES AND FOR THE PRODUCTION OF RECOVERABLE HEAT FROM HYDROCARBON-BEARING SOLID PARTICLES AND APPARATUS THEREFOR

[75] Inventors: Heinz Voetter; Richard C. Darton; Hubrecht C. A. Van Meurs; Rajamani Krishna, all of The Hague, Netherlands

[73] Assignee: Shell Internationale Research Maatschappij B.V., Netherlands

[21] Appl. No.: 530,442

[22] Filed: Sep. 8, 1983

[30] Foreign Application Priority Data

Oct. 21, 1982 [GB] United Kingdom ............... 8230131

[51] Int. Cl.$^3$ ............................................. F23D 1/00
[52] U.S. Cl. ................................ 110/347; 110/244; 110/245
[58] Field of Search ............. 110/236, 244, 245, 347, 110/346; 122/4 D

[56] References Cited

U.S. PATENT DOCUMENTS

| | | | |
|---|---|---|---|
| 3,888,193 | 6/1975 | Kishigami et al. | 110/245 |
| 4,111,158 | 9/1978 | Reh et al. | 122/4 D |
| 4,165,717 | 8/1979 | Reh et al. | 122/4 D |
| 4,244,779 | 1/1981 | Nieminen et al. | 162/30 R |
| 4,311,670 | 1/1982 | Nieminen et al. | 422/145 |
| 4,325,327 | 4/1982 | Kantesaria et al. | 110/245 X |

FOREIGN PATENT DOCUMENTS 0008469 8/1978 European Pat. Off.
1491363 11/1977 United Kingdom.
2072696 10/1981 United Kingdom.

Primary Examiner—Edward G. Favors
Attorney, Agent, or Firm—Jones, Tullar & Cooper

[57] ABSTRACT

Process and apparatus for the combustion of coke present on solid particles from which hydrocarbons have been substantially removed by heating, and for the production of recoverable heat from hydrocarbon-bearing solid particles, in a series of at least two combustion stages. The process comprises the followng steps:

(a) feeding the solid particles into the first combustion stage of the series through an inlet near its bottom;

(b) introducing an oxygen-containing gas into the bottom of each combustion stage, whereby at least part of the particles are entrained towards an upper outlet and at least part of the coke on the particles is combusted, yielding a flue gas;

(c) passing the particles and the flue gas from the upper outlet of each combustion stage into a separation stage, following each combustion stage;

(d) separating the flue gas from the particles in each separation stage, discharging the flue gas at the top of the said stage and withdrawing the particles at the bottom thereof;

(e) introducing at least a part of the withdrawn particles into the next combustion stage subsequent to the separation stage through an inlet near its bottom, thereby starting a new sequence essentially the same as in (a) through (d), at least a part of the particles withdrawn from the last separation stage being discharged.

26 Claims, 2 Drawing Figures

PROCESS FOR THE COMBUSTION OF COKE PRESENT ON SOLID PARTICLES AND FOR THE PRODUCTION OF RECOVERABLE HEAT FROM HYDROCARBON-BEARING SOLID PARTICLES AND APPARATUS THEREFOR

This invention relates to a process for the combustion of coke present on solid particles from which hydrocarbons have been substantially removed by heating. It further relates to a process for the production of recoverable heat from hydrocarbon-bearing solid particles. It also relates to an apparatus for carrying out such processes.

It is well known that hydrocarbons can be removed from hydrocarbon-bearing material, such as oil shale, tar sand and coal, by heating particles of such material to a temperature of at least 400° C. in the substantial absence of free oxygen, and recovering the removed hydrocarbons. In the case of oil shale this process is usually referred to as retorting, and in the case of coal, it is called pyrolysis.

In a number of different known processes the heating of the particles is carried out by heat exchange with a heat-bearing medium. Such a heat-bearing medium may, for example, be a solid medium consisting of inert particles which are heated in a separate vessel and then circulated through the vessels where the hydrocarbons are removed. Sand or pieces of ceramic may be used for this purpose.

Certain of the known retorting processes make use of the fact that the spent material, i.e. the material after removal of the hydrocarbons, contains appreciable amounts of coke. It has therefore been proposed to generate the heat required for the retorting process by complete or partial combustion of this coke to produce a hot spent material. This hot spent material may be employed as heat-bearing medium in the retorting process.

The combustion may be carried out while maintaining the solid particles in a fluidized condition. In a fluidized bed combustor the cross-sectional area is determined by the oxygen-containing gas required and the highest gas velocity possible without entraining the particles. That means that a large combustor is to be used. Moreover when a practically suitable bed height is applied the pressure drop over the dense bed is high which adds considerably to the compressor costs. The residence time of the particles in a fluidized bed combustor is long, so that undesirable side reactions may occur. In the case of the combustion of spent oil shale containing calcium carbonate, endothermic carbonate decomposition may take place which has a detrimental effect on the process thermal efficiency.

The combustion may also be carried out in a riser combustor, through which the spent material is lifted by a flow of an oxygen-containing gas. This technique has been widely advocated. It has, however, the drawback that a very tall riser is needed to obtain the desired degree of combustion of coke which raises constructional problems and leads to high costs. Moreover, to maintain a proper operation in a riser it is bound to a maximum diameter of the order of 1.5 m, so that for a larger plant a multiplicity of such risers—in parallel—would be needed. Furthermore, the incorporation of heat exchange surfaces into the risers in those cases where excess heat is produced, is troublesome.

An object of the invention is to provide a process for the combustion of spent material in which process the pressure drop is much less than in a conventional fluidized bed combustor and in which process temperature control is easy and residence time of the particles is short. The equipment for such a process should not cause constructional problems and high costs as in the case of a riser combustor.

It is a further object of the invention to provide a process for the combustion of hydrocarbon-bearing solid particles and for recovering the heat so produced. The heat so recovered may be used for raising steam for power stations.

The invention therefore relates to a process for the combustion of coke present on solid particles from which hydrocarbons have been substantially removed by heating in a series of at least two combustion stages, comprising the following steps:

(a) feeding the solid particles into the first combustion stage of the series through an inlet near its bottom;

(b) introducing an oxygen-containing gas into the bottom of each combustion stage, whereby at least part of the particles are entrained towards an upper outlet and at least part of the coke on the particles is combusted, yielding a flue gas;

(c) passing the particles and the flue gas from the upper outlet of each combustion stage into a separation stage following each combustion stage;

(d) separating the flue gas from the particles in each separation stage, discharging the flue gas at the top and withdrawing the particles at the bottom of the separation stage;

(e) introducing at least a part of the withdrawn particles through an inlet near the bottom into the next combustion stage subsequent to the separation stage thereby starting a new sequence essentially the same as in (a) through (d), at least a part of the particles withdrawn from the last separation zone being discharged.

The pressure drop over each combustion stage is rather low due to a less dense bed than in case of a conventional fluidized bed combustor. Reactors containing the combustion stages are not as voluminous as a conventional fluidized bed combustor or as tall as a riser combustor. The total solids inventory of the reactors is therefore smaller than of the conventional combustors mentioned. This makes the construction of the present reactors and also of the separators containing the separation stages relatively easy. The equipment for the process according to the invention may be light and less expensive, and many parallel combustion units, as in the case of riser combustors, can be avoided even in very large plants.

The installation of heat exchange surfaces in the reactors and separators, whenever appropriate, may be easily accomplished.

The temperature in each combustion stage can be regulated, so that an optimal combustion can be achieved. The temperature is controlled by the possible variation in the flow of oxygen-containing gas to each combustion stage and thus, in the heat production in each combustion stage. Residence times of the particles in the combustion stages are short, nevertheless a complete combustion of the coke can be obtained due to a good control of the coke conversion by means of a good temperature control and by the degree of staging achieved.

The preferred number of combustion stages is dependent on the amount of coke present on the solid particles and the required level of coke conversion by combustion. When high coke conversion is desired, more combustion stages will advantageously be used. From an economic point of view at most 5 combustion stages will preferably be used. Two combustion stages are applied when the coke content on the solid particles is relatively low, or when a moderate degree of coke conversion is acceptable. In general, preferably 2 to 5 combustion stages in series are used.

When a single combustion stage is applied only a portion of the coke present on the particles is burned off.

In this case, coke conversion could be improved by recycling of part of the combustor exit stream, which would still contain coke, back to the combustor inlet. However, a very voluminous combustor would result, since all the oxygen-containing gas required for combustion would be supplied to this one unit. Moreover, temperature control over the combustion would be less flexible than in the case of more than one combustion stage, when such control may be achieved by varying the proportion of gas supplied to the stages.

The coke content of the solid particles from which hydrocarbons have been recovered by heating generally is in the range of from 1 to 12% wt.

Due to a good heat exchange between the gas and the solid particles in the combustion stages no overheated spots are present. The temperature in the combustion stages can be controlled by means of the amount of oxygen fed into each combustion stage. Control may take place by varying either the oxygen concentration in the gas or the flow of the oxygen-containing gas. Nevertheless it may be the case that too much heat is evolved, e.g. when a large amount of coke is present on the particles. In that case the combustion stages are preferably being cooled by means of a cooling system. This cooling system usually comprises cooling tubes which are attached to the inner wall of the combustion vessel and through which a cooling fluid, such as water or steam, is passed.

After removal of hydrocarbons therefrom, the solid particles may have sizes within a wide distribution range. That means that generally also rather coarse particles (i.e. particles with a diameter larger than 1 mm) are present in the first combustion stage, which may not be entrained by the gas. In order to avoid an accumulation of coarse particles in the first combustion stage they are preferably discharged from the first combustion stage through a solids outlet near the bottom. By preventing these particles from staying in the combustion stage for too long a time certain side reactions such as (endothermic) carbonate decomposition take place only to a limited extent, thereby avoiding a significant detrimental effect on the overall thermal efficiency.

The particle size distribution range may also be such that hardly any coarse particles are present. The solid particles in that case may be entrained by the gas so fast that coke present on these particles is not sufficiently burned off. It will be advantageous in such a case to recycle part of the particles withdrawn from the bottom of the separation stage to the preceding combustion stage and to introduce said part of withdrawn particles into said stage at a level above the inlet of the additional oxygen-containing gas to be discussed hereinafter. Recycling of part of the withdrawn particles to the preceding combustion stage offers another possibility to control the burn-off of the coke by increasing the residence time of the particles in the combustion stage concerned. Coarse particles may particularly be absent in the stages following the first combustion stage because through combustion the solid particles may disintegrate into fines as will be discussed hereinafter. In such a case the partly recycling of solid particles to the preceding combustion stage may be of particular advantage in operating the process of the present invention.

From the above it is evident that depending on the particle size distribution either a partly recycling of solid particles will be applied, or, in case sufficiently large particles are present and remain present for the next combustion stage(s), no recycling will be used at all.

Coarse particles can be removed from the system, but as they may still contain some coke, it is desirable to burn off the remainder of the coke. Thereto they may be passed to a separate combustion zone, comprising e.g. a conventional fluidized bed combustor or a kiln. Preferably they are maintained in the system and passed to the second combustion stage. For the coarse particles in the second stage the same goes as for those in the first stage. So they are preferably contained in the second combustion stage relatively briefly, and are passed to a subsequent combustion stage. So the second combustion stage is provided with an outlet near the bottom for the coarse particles, too. After combustion in the second combustion stage the coarse particles are discharged from this combustion stage. They can be removed from the system, but they are preferably passed to the subsequent combustion stage in order to burn off most of the coke they (still) contain. They are removed from the system after having been discharged from the last combustion stage. Therefore, coarse particles are preferably discharged from a combustion stage through a solids outlet near the bottom and are passed from each but the last combustion stage to the subsequent combustion stage, the coarse particles discharged from the last combustion stage being removed from the system.

The removed coarse particles are advantageously combined with the particles withdrawn from the last separation stage. In the manner described most coke is burned off from the coarse particles while side reactions only occur to a limited degree due to the relatively short and controlled residence times of the coarse particles in each combustion stage. Care is taken that the total residence time in the combustion stages is not too long.

As already has been stated, side reactions may occur often resulting in the production of fines through disintegration of the solid particles. If the particles contain carbonates, one of the most prominent side reactions involves carbonate decomposition. This reaction is highly endothermic and has therefore a disadvantageous effect on the heat economy. Tar sands as well as coal may contain minerals which decompose endothermically, but especially in oil shale carbonates are often present in considerable quantities. Carbonate decomposition starts at a relatively low temperature, however, the decomposition becomes important at temperatures above 800° C. in combination with residence times of 10 to 15 seconds or more. So it is possible to prolong the residence time at temperatures below 800° C., alternatively it is possible to increase the temperature over 800° C. by applying residence times shorter than 10 seconds. Because too low a temperature is not favourable for the combustion reactions the temperature in the process according to the invention is not allowed to decrease under 500° C. On the other hand, at temperatures over 900° C. the decomposition of carbonates, if present in the particles, occurs to a too great extent, even at residence times as short as practically feasible. In case the oil shale is low in carbonates content higher combustion temperatures are allowable. So, preferably the temperature in the combustion stages is kept within the range from 500° to 900° C. The residence time applied depends on the coke and minerals content of the solid particles. Due to the short residence times, generally between 5 and 12 seconds, the temperatures in the second and subsequent stages can be allowed to rise above 700° C. which is beneficial for coke combustion.

A further means to limit carbonate decomposition, particularly at locations in the combustion stages where solids holdups and residence times may be longer than some 5 to 10 seconds at higher temperatures (e.g. in the standpipes of the cyclones of the intermediate separation stages) is to reinject flue gases containing appreciable $CO_2$ contents, thereby decreasing the net rate of decomposition of carbonates to oxides and $CO_2$.

As carbonate decomposition is limited in the process according to the invention the overall thermal efficiency of the process is high.

The oxygen-containing gas required for the combustion may be introduced at two levels. One primary stream is introduced into a combustion stage through the bottom in order to bring the particles into a substantially fluidized condition and optionally to entrain the particles to the upper outlet. A secondary gas stream is preferably passed into the combustion stage at a higher level. In this way the combustion per stage is effected in two steps. This results in a smooth combustion and avoids flow instabilities. In the space between the bottom of a combustion stage and the level at which the secondary oxygen-containing gas is introduced, the gas velocity is relatively low. Introduction of solids from either the feed or from a separation stage is rather simple in that area. Therefore, additional oxygen-containing gas may advantageously be introduced into each combustion stage at a level above the feed inlet for solid particles.

The oxygen-containing gas used may be selected from air, oxygen-enriched air, oxygen-depleted air or oxygen. It is most economic to use air. The primary and secondary oxygen-containing gas streams may have the same composition and may be supplied via one supply line. So, it is possible to pass an air stream through a supply tube, split the stream into two partial streams, feeding one partial stream through the bottom into a combustion stage and passing the other stream through at least one inlet at a higher level into the same combustion stage. However, different supply tubes may also be used for the primary and the secondary oxygen-containing gas streams. Gases with a different oxygen content are also applicable.

In the separation stages preferably cyclones are used which can deal with moderate to high temperatures, and which have a good separation capacity. Other possible separators are e.g. impingement separators. In one separation stage more than one separator may be used, in series or in parallel. So it is suitable to use two cyclones, the first one having a size cut for rather coarse particles and the other one separating the finer particles from the flue gas. The use of two cyclones in parallel may be considered for very large combustion stages in order to keep the dimensions of such cyclones within reasonable proportions.

The cyclones, or their stand pipes, can suitably be cooled. In this way the particles which leave the cyclones for the next combustion stage are also cooled, but remain warm enough to promote good coke combustion in the next combustion stage. They are not so hot that during the combustion in this next combustion stage their temperature would increase to such an extent that appreciable carbonate decomposition would take place. In applying cooled cyclones the flue gas too will be cooled, heat being recovered therefrom.

Preferably, the heat of the flue gases is partly used for preheating the oxygen-containing gas before the latter is introduced into the combustion stage. Another part of the heat of the flue gases is advantageously being used for steam generation.

In the flue gases some carbon monoxide may be present because of a possible substoichiometric amount of oxygen introduced in a combustion stage. This may occur especially in the first combustion stages. In order to remove the carbon monoxide before or after the heat recovery of the flue gas at least part of the discharged flue gas is advantageously afterburned. Optionally, a relatively small quantity of supplemental fuel may be supplied into such an afterburning stage in order to achieve controlled carbon monoxide combustion.

The particles discharged from the last separation stage are preferably partly recycled to the first combustion stage. This preferred embodiment serves two objectives. Firstly the recycled hot particles supply heat to the first combustion stage. Preferably, so many particles are recycled to the first combustion stage that the mean temperature of the feed particles and of the recycled particles is between 500° and 700° C. to accomplish rapid ignition in the first combustion stage. Some spent shale, however, is sufficiently reactive to ignite at lower temperatures so that for this reason recycling hot shale may be omitted. Secondly the particles might still contain any unburned coke. By recycling them, a better coke removal is obtained.

Suitably another part of the particles discharged from the last separation stage is introduced as heat carrier into a retorting zone where hydrocarbons are removed from hydrocarbon-bearing solids by heating. In case the hydrocarbon-bearing solids are preheated before the retorting zone still another part of the hot discharged particles from the last separation stage is advantageously used for this pretreatment.

The process as described is eminently suitable for application in order to produce recoverable heat from hydrocarbon-bearing solid particles such as oil shale with a low kerogen content. To that end the hydrocarbon-bearing solid particles are combusted in a series of at least two combustion stages the process comprising the following steps:

(a) feeding the solid particles into the first combustion stage of the series through an inlet near its bottom;

(b) introducing an oxygen-containing gas into the bottom of each combustion stage, whereby at least a part of the particles are entrained towards an upper outlet and at least part of the hydrocarbon in the particles is combusted, yielding a flue gas;

(c) passing the particles and the flue gas from the upper outlet of each combustion stage into a separation or stage, following each combustion stage;

(d) separating the flue gas from the particles in each separation stage, discharging the flue gas at the top of the said stage and withdrawing the particles at the bottom thereof;

(e) recovering heat from the discharged flue gas by indirect heat exchange and introducing at least part of the withdrawn particles into the next combustion subsequent to the separation stage through an inlet near its bottom, thereby starting a new sequence essentially the same as in (a) through (d), at least a part of the particles withdrawn from the last separation stage being discharged and heat being recovered therefrom by indirect heat exchange.

In order to optimize the heat recovery the combustion stages may be cooled by means of a cooling/energy recovering system and in the separation stage(s) one or more cyclones may be used which cyclones are being cooled. At least a part of the discharged flue gas may be used for preheating the oxygen-containing gas before the introduction of the latter into the combustion stages. The other part of the discharged flue gas can be used in a conventional manner for generating steam via a convection bank. Also the particles discharged from the last separation stage may be used for generating steam. At least a part of the discharged flue gas may also be afterburned, heat being recovered from the gas so combusted. A further part of the flue gas, particularly if it contains a large amount of $CO_2$ may also be re-injected into the separation stages as described hereinbefore.

The above-described process for combusting hydrocarbon-bearing solid particles for producing recoverable heat is particularly suitable for combusting oil shale having a relatively low kerogen content, i.e. less than 12% wt, thereby covering the needs for the processing of poor quality oil shales.

The invention also relates to an apparatus for the combustion of coke present on solid particles from which hydrocarbons have been removed by heating, comprising at least two combustion reactors in series, each combustion reactor having at least one inlet for solid particles near the bottom, a gas inlet in the bottom and an upper outlet which is connected to at least one separator, each separator having a gas discharge tube at the top and a discharge tube for solid particles at the bottom, which latter tube leads to the inlet for solid particles of the subsequent combustion reactor, the tube of the last separator being a discharge tube.

One or more of the combustion reactors may have a second inlet for solid particles, the separator having a discharge tube for solid particles which is connected both to the said second inlet of the preceding combustion reactor and to the first inlet for solid particles of the subsequent combustion reactor. Preferably this second inlet is positioned above a second inlet for gas near the bottom of the combustion reactor.

The number of combustion reactors in series is preferably 2 to 5. Each combustion reactor may be suitably provided with cooling means. A pipe wall through which a coolant, e.g. water and/or steam, is passed, is very suitable. A cooling device in the interior of the combustion reactor is also applicable.

The first combustion reactor is preferably provided with an outlet for coarse particles near the bottom. The coarse particles discharged through said outlet are either withdrawn and optionally combined with the particles discharged from the last separator or passed to a separate combustor or passed to the second combustion reactor. In the latter case the second combustion reactor is also provided with a solids outlet near the bottom. Particles discharged through that outlet of the second combustion reactor can be transported to any subsequent combustion reactor.

The last combustion reactor is preferably provided with a solids outlet for coarse particles from which a transport means leads to the discharge tube of the last separator. So, each combustion reactor is preferably provided with an outlet for coarse particles near the bottom from which a transport means leads to an inlet near the bottom of the subsequent combustion reactor, the transport means from the last combustion zone leading to the discharge tube of the last separator. Any suitable transport means may be used, e.g. a screw conveyor, a conveyor belt, a solids pump or a tube though which the particles are passed by means of a carrier gas.

The combustion reactors are preferably provided with one or more inlets for additional oxygen-containing gas which advantageously are situated at a higher level than the solids inlet.

The separators are preferably cyclones. They, too, can be provided with cooling means. A good separation is generally attained by means of one cyclone after each combustion reactor. In order to achieve a very good separation it is suitable to use two cyclones between two successive combustion reactors. The separation is most conveniently accomplished when firstly the relatively coarse particles are separated and the remainder of the solids is separated in the second cyclone. The particles separated in both cyclones are combined and passed together to the subsequent combustion reactor.

The invention will now be illustrated by reference to the accompanying schematic drawings, which illustrate the recovery of hydrocarbons from oil shale applying a combustion process according to the invention, but to which the invention is by no means restricted. In the drawing auxiliary equipment, such as pumps, compressors, valves, cleaning and cooling devices, and control instruments are not included.

Figure 1:
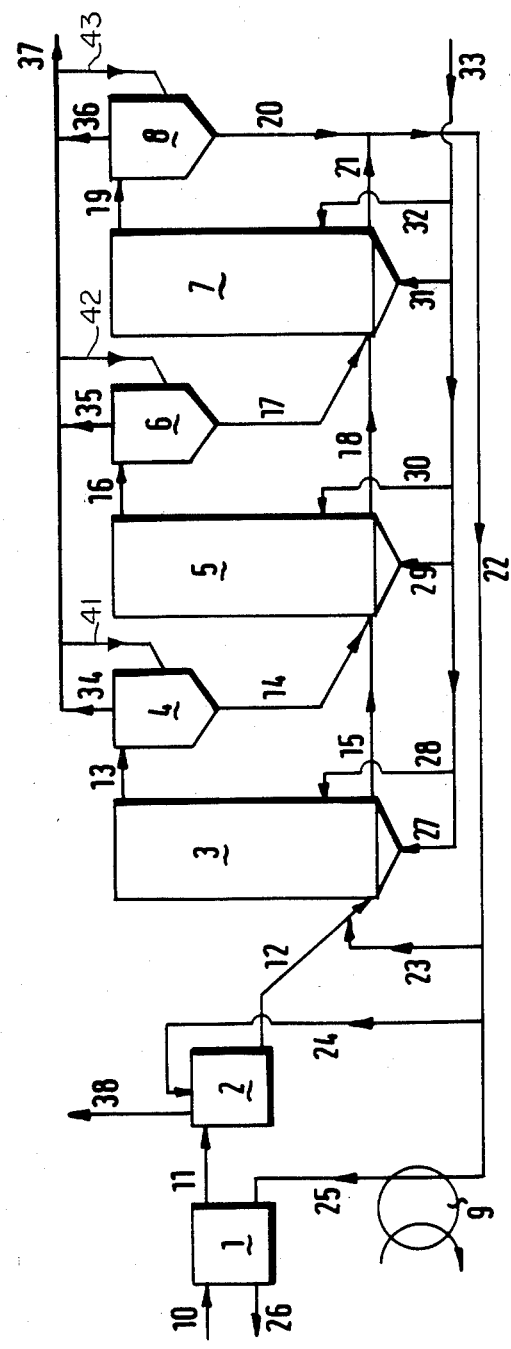
FIG. 1 represents a three-stage combustion plant which is suitably used for combusting solid particles which comprises a substantial portion of coarse particles.

In FIG. 1 oil-bearing shale particles are fed at ambient temperature via a line 10 to a preheating zone 1 which may be operated as described in our co-pending U.S. patent application Ser. No. 369,684. Hot shale, from which hydrocarbons have been removed and from which the then remaining coke has been burned off, is fed as a heating medium into the preheating zone 1 via a line 25. After having passed through the preheating zone 1, the then cooled shale is discharged via a line 26.

The preheated oil-bearing shale leaves the preheating zone 1 via a line 11 and is passed to a retorting zone 2, which may be operated as disclosed in our co-pending U.S. patent application Ser. No. 369,685. Heat is delivered to the retorting zone 2 by hot shale supplied via a line 24. Hydrocarbons removed from the oil-bearing shale are withdrawn from the retorting zone 2 via a line 38. The spent shale particles having coke thereon from the retorting zone 2 are fed into a combustion stage 3 at a place near the bottom via a supply tube 12. Into the tube 12 recycled hot shale is injected, via a line 23. Most of the particles in the combustion stage 3 are entrained upwards by air passed into the stage 3 through the bottom via a line 27 and at a higher level via a line 28. This air is supplied via a line 33. Coarse particles which are not entrained are withdrawn via a line 15 and passed into a solids inlet of a subsequent combustion stage 5.

The entrained particles are passed with generated flue gas through a line 13 and separated from the flue gas in a cyclone 4. They are then introduced into the combustion stage 5 via a line 14. In the stage 5 a combustion similar to the one in stage 3 takes place; air is introduced via lines 29 and 30, coarse particles are withdrawn through line 18 and passed into a solids inlet of a subsequent combustion stage 7, entrained particles are passed with generated flue gas via a line 16 to a cyclone 6 where the particles are separated from the flue gas and passed via a line 17 into the third combustion stage 7. In the stage 7 a similar combustion as described with relation to the stages 3 and 5 is carried out. Air introduced at two levels through lines 31 and 32 burns off the remaining coke from the particles. Coarse particles are withdrawn via a line 21. The entrained particles are passed via a line 19 into a cyclone 8, where the particles are separated from the generated flue gas. They are withdrawn via a line 20 and, after having been combined with the coarse particles from the line 21, recycled through a line 22. If desired the particles withdrawn via the line 20 and the coarse particles from the line 21 may be separately recycled and/or discharged.

The flue gas from the cyclones 4, 6 and 8 is discharged via the lines 34, 35 and 36 respectively and combined in a line 37. If necessary the hot gases may be afterburned and subjected to heat exchange (not shown) with air which is to be passed into the line 33. Also, part of the discharged flue gas may be re-injected into one or more of the cyclones as indicated at 41, 42 or 43.

The discharged hot shale from the line 22 is partly recycled to the combustion stage 3 by passing part of it through the line 23 into the shale supply line 12. Another part of the hot shale is used as a heat-bearing medium in the retorting zone 2 and is thereinto supplied through the line 24. The remainder of the hot spent shale is passed to the preheating zone 1 via the line 25. The hot spent shale in the line 25 may optionally be cooled in cooler 9 before being fed into the preheating zone 1.

Figure 2:
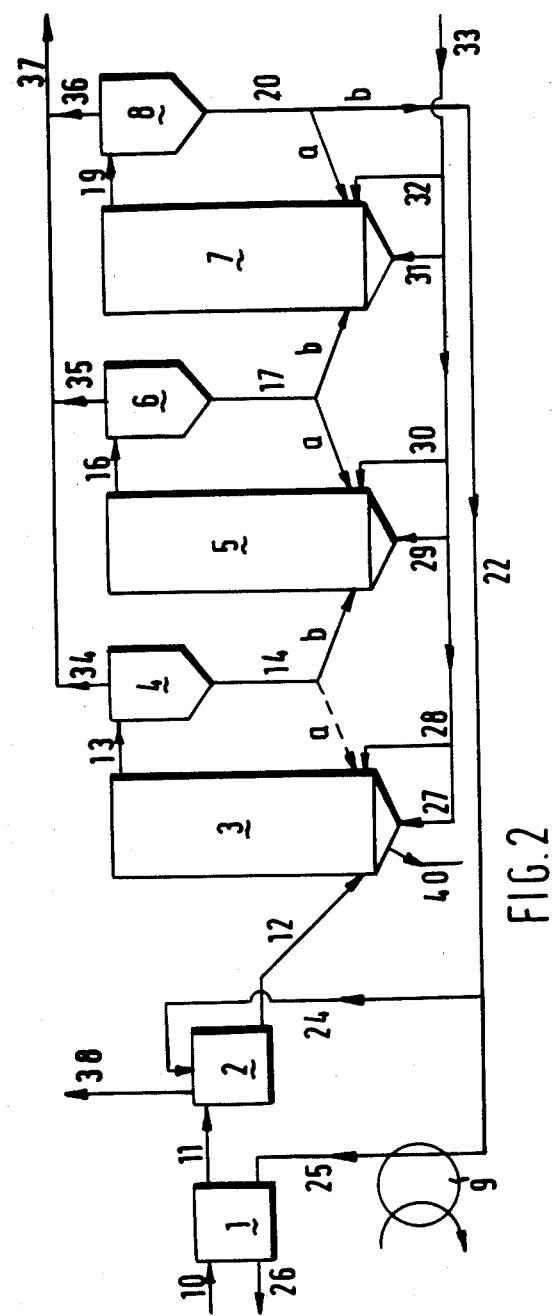
FIG. 2 represents a three-stage combustion plant which is suitably used for combusting solid particles in which coarse particles are substantially absent.

In FIG. 2 the corresponding parts are indicated with the same reference numerals. The flow scheme shown is particularly suitable for processing solid particles which do not contain coarse particles or for processing solid particles which disintegrate during the combustion so that after the first combustion zone 3 hardly any coarse particles remain. Any coarse particles accumulating in the bottom of this combustion stage may (periodically) be removed via a line 40. Particles withdrawn from the separation stage 6 are partly introduced into the next combustion stage 7 via a line 17b and partly re-introduced into the preceding combustion stage 5 via a line 17a at a level above the inlet of secondary air supplied via the line 30.

Similarly part of the particles withdrawn from the separation stage 8 are partly recycled to the preceding combustion stage 7 via a line 20a to ensure complete combustion of any coke remaining on the fine solid particles. The other part of solid particles is withdrawn via a line 20b and recycled through the line 22 for introduction into the retorting zone 2 and for use as a heat source in the preheating zone 1 as described hereinbefore.

For combustion of very fine solid particles one may consider modifying the above scheme further by re-introducing a part of the solid particles withdrawn from the separation stage 4 into the preceding zone 3 in a manner as described for the particles withdrawn from the separation stage 6. In FIG. 2. this possibility is shown by the dotted line 14a.

EXAMPLE 1

The process as described with reference to FIG. 1) may be operated continuously under the following calculated conditions:

| Oil-bearing shale particles | |
|---|---|
| Initial composition: | |
| water | 8.3% w |
| organic material | 19.2% w |
| minerals | 72.5% w |
| Pre-heating zone | |
| Fresh shale feed | 58 kg/s |
| Initial temperature shale particles | 25° C. |
| Final temperature shale particles | 250° C. |
| Retorting zone | |
| Temperature of hot recycled shale | 850° C. |
| Preheated shale feed rate | 53.2 kg/s |
| Recovered hydrocarbons | 7.05 kg/s |

COMBUSTION ZONE

From the retorting stage 2 86.0 kg/s of spent shale having a temperature of 482° C. is supplied. The coke content of this shale is 6.1%w. Through the line 23 19.5 kg/s recycled shale of 850° C. is combined with the shale in the line 12. The coke content of this recycled shale is 2.9%w. The combination results in a feed to the combustion stage 3 of 105.5 kg/s shale containing 5.5%w coke with a temperature of 550° C.

The combustion process can be operated under the calculated conditions shown hereafter in Table I.

TABLE I

| Reactor No. | Fine particles entrained, kg/s (stream No.) | Coarse particles withdrawn near the bottom, kg/s (stream No.) | Air introduced | | Temperature, °C. | Coke content of discharged shale, % w |
|---|---|---|---|---|---|---|
| | | | through the bottom, kg/s | at higher level, kg/s | | |
| 3 | 91.6 (13) | 9.6 (15) | 3.9 | 14.3 | 705 | 4.4 |
| 5 | 88.3 (16) | 9.3 (18) | 3.9 | 10.2 | 804 | 3.6 |
| 7 | 85.5 (19) | 9.0 (21) | 3.9 | 7.0 | 850 | 2.9 |

The hot shale discharged through the lines 20 and 21 is combined. A part (39.9 kg/s) is used in the retorting zone, another part (19.5 kg/s) is injected into the line 12 and the remainder (35.1 kg/s) is used in the preheating zone of the process.

EXAMPLE 2

The process may be carried out substantially as described in Example 1, however without recycle of hot spent shale to the first combustion stage. (In the figure: line 23 is not being used or is absent). A process according to this Example is applicable if the retorted shale can easily be ignited.

The process can be carried out continuously under the following calculated conditions:

Hot spent shale is discharged via the line 20b in an amount of 72.2 kg/s and partly introduced into the retorting zone (40.1 kg/s) and partly introduced into the preheating zone. (32.1 kg/s).

TABLE III

| Reactor No. | Feed stream kg/s (stream No.) | Recycle stream, kg/s (stream No.) | Air introduced through the bottom, kg/s | Air introduced at higher level, kg/s | Temperature, °C. | Coke content of discharged shale, % w |
|---|---|---|---|---|---|---|
| 3 | 86.2 (12) | 215.5 (14a) | 3.9 | 19.7 | 726 | 3.8 |
| 5 | 75.7 (14b) | 151.4 (17a) | 3.9 | 11.4 | 819 | 2.6 |
| 7 | 72.2 (17b) | 117.0 (20a) | 3.9 | 6.1 | 850 | 1.9 |

| Oil-bearing shale particles | |
|---|---|
| Initial composition: | |
| water | 8.3% w |
| organic material | 19.2% w |
| minerals | 72.5% w |
| Pre-heating zone | |
| Fresh shale feed | 58 kg/s |
| Initial temperature shale particles | 25° C. |
| Final temperature shale particles | 250° C. |
| Retorting zone | |
| Temperature of hot recycled shale | 850° C. |
| Preheated shale feed rate | 53.2 kg/s |
| Recovered hydrocarbons | 7.05 kg/s |

COMBUSTION ZONE

From the retorting zone 2 86.2 kg/s of spent shale having a temperature of 482° C. is supplied. The coke content of this shale is 5.6%w. This shale is fed into combustion stage 3.

The combustion process can be operated under the calculated conditions shown hereafter in Table II.

TABLE II

| Reactor No. | Fine particles entrained, kg/s (stream No.) | Coarse particles withdrawn near the bottom, kg/s (stream No.) | Air introduced through the bottom, kg/s | Air introduced at higher level, kg/s | Temperature, °C. | Coke content of discharged shale, % w |
|---|---|---|---|---|---|---|
| 3 | 70.6 (13) | 9.6 (15) | 3.9 | 19.7 | 723 | 3.9 |
| 5 | 66.6 (16) | 9.1 (18) | 3.9 | 11.4 | 813 | 2.7 |
| 7 | 63.5 (19) | 8.7 (21) | 3.9 | 6.1 | 850 | 1.9 |

The hot shale discharged through the lines 20 and 21 is combined. A part (40.0 kg/s) is used in the retorting zone and the remainder (32.2 kg/s) is used in the preheating zone of the process.

EXAMPLE 3

The combustion process may be carried out in accordance with FIG. 2. As the retorted oil shale mainly consists of very fine particles (smaller than 0.05 mm) recycle of oil shale over each individual stage is applied. This means that in FIG. 2 line 14a is present. From the retorting zone 2 86.2 kg/s of spent shale having a temperature of 482° C. is applied. The coke content of this shale which is fed into combustion stage 3 is 5.6% wt.

The combustion process can be operated under the calculated conditions shown hereafter in Table III. To accommodate the larger flows involved several parallel cyclones in the respective separation stages 4, 6 and 8 are used.

What is claimed is:

1. Process for the combustion of coke present on solid particles from which hydrocarbons have been substantially removed by heating, in a series of at least two combustion stages under entrainment conditions, comprising the following steps:
   (a) feeding all the solid particles into the first combustion stage of the series, through an inlet near its bottom;
   (b) introducing an oxygen-containing gas into the bottom of each combustion stage, whereby at least part of the particles are entrained towards an upper outlet and at least part of the coke on the particles is combusted, yielding a flue gas;
   (c) passing the particles and the flue gas from the upper outlet of each combustion stage into a separation stage, following each combustion stage;
   (d) separating the flue gas from the particles in each separation stage, discharging the flue gas at the top of the said stage and withdrawing the particles at the bottom thereof; and
   (e) introducing at least a part of the withdrawn particles into the next combustion stage subsequent to the separation stage through an inlet near its bottom, thereby starting a new sequence essentially the same as in (a) through (d), at least a part of the particles withdrawn from the last separation stage being discharged.

2. Process as claimed in claim 1, in which two to five combustion stages in series are used.

3. Process as claimed in claim 1 or 2, in which the combustion stages are being cooled by means of a cooling system.

4. Process as claimed in claim 1 or 2, in which coarse particles are discharged from the first combustion stage through a solids outlet near the bottom.

5. Process as claimed in claim 1 or 2, in which coarse particles are discharged from a combustion stage through a solids outlet near the bottom and are passed from each but the last combustion stage to the subsequent combustion stage, the coarse particles discharged from the last combustion stage being removed from the system.

6. Process as claims in claim 1 or 2, in which a part of the particles discharged from the last separation stage is recycled to the first combustion stage.

7. Process as claimed in claim 1 or 2, in which a part of the withdrawn particles is recycled to the preceding combustion stage.

8. Process as claimed in claim 7, in which the recycled particles are introduced into the said combustion stage at a level above an inlet for additional oxygen-containing gas into the combustion stage.

9. Process as claimed in claim 6, in which the mean temperature of the solid particles and the particles recycled to the first combustion stage is between 500° and 700° C.

10. Process as claimed in claim 1 or 2, in which the temperature in the combustion stages is in the range of from 500°–900° C.

11. Process as claimed in claim 1 or 2, in which additional oxygen-containing gas is introduced into each combustion stage at a level above the inlet for solid particles.

12. Process as claimed in claim 1 or 2, in which the oxygen-containing gas is air.

13. Process as claimed in claim 1 or 2, in which one or more cyclones are used in the separation stage(s).

14. Process as claimed in claim 1 or 2, in which at least a part of the discharged flue gas is re-injected into one or more of the separation stages.

15. Process as claimed in claim 1 or 2, in which at least a part of the particles discharged from the last separation stage is introduced as heat carrier into a retorting zone where hydrocarbons are removed from hydrocarbon-bearing solids by heating.

16. Process as claimed in claim 1 or 2, in which at least a part of the particles discharged from the last separation stage is used for preheating hydrocarbon-bearing solids.

17. Process for the production of recoverable heat from hydrocarbon-bearing solid particles by combusting the same in a series of at least two combustion stages under entrainment conditions, comprising the following steps:
  (a) feeding all the solid particles into the first combustion stage of the series through in inlet near its bottom;
  (b) introducing an oxygen-containing gas into the bottom of each combustion stage, whereby at least part of the particles are entrained towards an upper outlet and at least part of the hydrocarbon in the particles is combusted, yielding a flue gas;
  (c) passing the particles and the flue gas from the upper outlet of each combustion stage into a separation stage, following each combustion stage;
  (d) separating the flue gas from the particles in each separation stage, discharging the flue gas at the top of the said stage and withdrawing the particles at the bottom thereof; and
  (e) recovering heat from the discharged flue gas by indirect heat exchange and introducing at least a part of the withdrawn particles into next the combustion stage subsequent to the separation stage through an inlet near its bottom, thereby starting a new sequence essentially the same as in (a) through (d), at least a part of the particles withdrawn from the last separation stage being discharged and heat being recovered therefrom by indirect heat exchange.

18. Process as claimed in claim 17, in which the combustion stages are being cooled by means of a cooling system.

19. Process as claimed in claim 17 or 18, in which in the separation stage(s) one or more cyclones are used which cyclones are being cooled.

20. Process as claimed in claim 17 or 18, in which at least a part of the discharged flue gas is used for preheating the oxygen-containing gas before the introduction of the latter into the combustion stages.

21. Apparatus for the production of recoverable heat from hydrocarbon-bearing solid particles and for the combustion of coke present on solid particles from which hydrocarbons have been removed by heating, comprising at least two combustion reactors in series, each combustion reactor having at least one inlet for solid particles near the bottom, a gas inlet in the bottom and an upper outlet which is connected to at least one separator, one or more of the combustion reactors having a second inlet for solid particles, each separator having a gas discharge tube at the top and a discharge tube for solid particles at the bottom, which latter tube leads to the inlet for solid particles of the subsequent combustion reactor, the tube of the last separator being a discharge tube, wherein one or more of the separators has a further discharge tube for solid particles which is connected to said second inlet of the preceding combustion reactor.

22. Apparatus as claimed in claim 21 in which the second inlet is positioned above a second inlet for gas near the bottom of the combustion reactor.

23. Apparatus as claimed in claim 22, comprising two to five combustion reactors in series.

24. Apparatus as claimed in claim 21, 22 or 23, in which the first combustion reactor is provided with an outlet for coarse particles near the bottom.

25. Apparatus as calimed in claim 21, 22 or 23, in which a combustion reactor is provided with an outlet for coarse particles near the bottom, from which a transport means leads to an inlet near the bottom of the subsequent combustion reactor, the transport means from the last combustion reactor leading to the discharge tube of the last separator.

26. Apparatus as claimed in claim 21, 22 or 23, in which the separators are cyclones.

* * * * *